US006051682A

United States Patent [19]

Debrabander et al.

[11] Patent Number: 6,051,682

[45] Date of Patent: Apr. 18, 2000

[54] POLYMERIZATION OF FLUOROPOLYMERS IN CARBON DIOXIDE

[75] Inventors: F. Edward Debrabander, Bear, Del.; Paul Douglas Brothers, Chadds Ford, Pa.

[73] Assignee: E. I. du Pont de Nemours and Company, Wilmington, Del.

[21] Appl. No.: 08/987,937

[22] Filed: Dec. 10, 1997

Related U.S. Application Data

[60] Provisional application No. 60/033,001, Dec. 23, 1996.

[51] Int. Cl.[7] .......... C08F 6/00

[52] U.S. Cl. .......... 528/501; 526/942

[58] Field of Search .......... 528/501; 526/942

[56] References Cited

U.S. PATENT DOCUMENTS

| | | | |
|---|---|---|---|
| 5,200,442 | 4/1993 | Schlipf et al. | 528/501 |
| 5,496,901 | 3/1996 | DeSimone | 526/89 |
| 5,548,004 | 8/1996 | Mardel et al. | 528/501 |
| 5,559,198 | 9/1996 | Eian et al. | 526/89 |

FOREIGN PATENT DOCUMENTS

| | | | |
|---|---|---|---|
| 1180845 | 1/1985 | Canada | 528/501 |
| 45-3390 | 2/1970 | Japan . | |
| 2-302437 | 12/1990 | Japan | 528/501 |
| 6-345824 | 2/1994 | Japan | C08F 214/26 |
| WO 96/28477 | 9/1996 | WIPO | C08F 2/00 |

*Primary Examiner*—Bernard Lipman
*Assistant Examiner*—N. Sarofim

[57] ABSTRACT

Fluoromonomer is polymerized to obtain a fluoropolymer with the polymerization being carried out in a pressurized polymerization reactor containing a polymerization medium comprising liquid or supercritical $CO_2$. The polymerization medium is withdrawn from the reactor together with the fluoropolymer and flash decompressed to thereby recover the fluoropolymer from the medium.

7 Claims, 1 Drawing Sheet

POLYMERIZATION OF FLUOROPOLYMERS IN CARBON DIOXIDE

RELATED APPLICATIONS

This application claims the benefit of Provisional Application Ser. No. 60/033,001, filed Dec. 23, 1996.

FIELD OF THE INVENTION

The present invention relates to polymerization of fluorinated homopolymers and copolymers in a pressurized reactor containing a nonaqueous medium comprising liquid or supercritical carbon dioxide.

BACKGROUND OF THE INVENTION

Various methods for the polymerization of fluoropolymers in a nonaqueous medium of comprising liquid or supercritical carbon dioxide have been proposed. U.S. Pat. No. 5,496,901 discloses a processes for the making a variety of fluoropolymers comprising solubilizing a fluoromonomer in a solvent comprising carbon dioxide. PCT Publication No. WO 96/28477 discloses polymerization of a variety of fluoropolymers in a solvent comprising carbon dioxide while employing an initiator capable of producing stable end groups. These publications describe processes which work in laboratory scale reactors, e.g., 25–500 ml, when run in a batchwise fashion. In the Examples of these publications, the polymerization is run and then the reactor is vented and opened to recover the product. Such processes are not applicable to the commercial production of fluoropolymers where it is desired to recover product without having to disassemble the reactor.

Japanese Pat. Publication Kokai 6(1994)345824 discloses polymerizing TFE with fluorine-containing vinyl ethers in liquid carbon dioxide. A chemical initiator is used. Japanese Pat. Publication Kokoku 45(1970)3390 discloses the polymerization of either TFE or a TFE/olefin (hydrocarbon) copolymer in liquid carbon dioxide using irradiation with gamma rays to cause the polymerization. Continuous processes are mentioned in these references but only laboratory scale batch processes are illustrated in the examples.

SUMMARY OF THE INVENTION

In a process in accordance with the invention, fluoromonomer is polymerized to obtain a fluoropolymer with the polymerization being carried out in a pressurized polymerization reactor containing a polymerization medium comprising liquid or supercritical $CO_2$. The process further includes withdrawing the polymerization medium from the reactor together with the fluoropolymer and flash decompressing the withdrawn polymerization medium to thereby recover the fluoropolymer from the medium.

In a preferred process in accordance with the invention, the polymerization medium is stirred to distribute the fluoromonomer and the fluoropolymer in the medium and the polymerization medium is withdrawn from the reactor so that the medium withdrawn has substantially the same composition as medium remaining in the reactor.

In a most preferred process in accordance with the invention, portions of the polymerization medium including the fluoropolymer are successively withdrawn and isolated from the reactor and the flash decompression is carried out on each portion.

The invention is advantageously employed in continuous processes in which the polymerizing is carried out continuously by continuously feeding $CO_2$ and fluoromonomer into the reactor and continuously withdrawing the contents of the reactor, including unreacted fluoromonomer, $CO_2$, and fluoropolymer. Preferably, the feeding of $CO_2$ and fluoromonomer and the withdrawing of the contents of the reactor are carried out to establish a substantially steady state composition of the medium in the reactor. Most preferably, the medium withdrawn has substantially the same composition as the steady state composition in the reactor. In another preferred form of the process, an initiator is included in the polymerization medium which becomes associated with the polymer recovered from the process.

The process in accordance with the invention enables the production of a wide variety of fluoropolymers in batch, semi-continuous, and continuous processes without the need to open the reactor to recover the polymer. Flash decompression provides a high velocity flow through effluent lines to decrease fouling. In addition, the rapid cooling which occurs substantially causes the polymerization to stop so that product properties can be determined by conditions inside the reactor.

DETAILED DESCRIPTION

Figure 1:
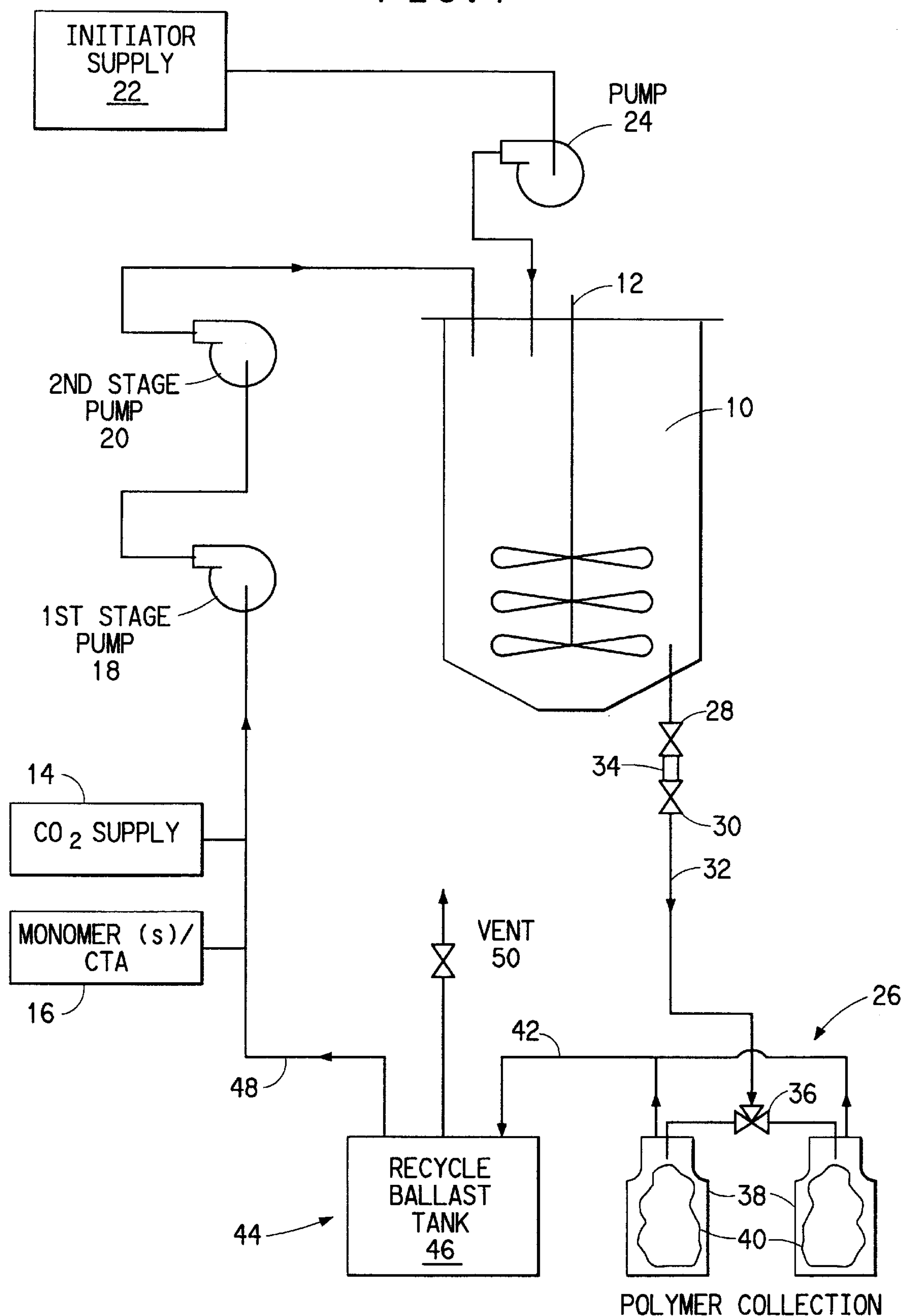
FIG. 1 is a schematic view of equipment suitable for carrying out a process in accordance with the present invention.

The invention is useful for the manufacture of a wide variety of fluoropolymers. "Fluoropolymers" as used in this application is intended to encompass a broad spectrum of thermoplastic and/or elastomeric polymers of at least one flurorinated monomer. These fluoropolymers may be homopolymers of a fluoromonomer, may be copolymers of two or more fluoromonomers, or may be copolymers of at least one fluoromonomer and at least one fluorine-free monomer.

"Fluoromonomers" is used in this application to mean compounds containing a vinyl group that may be free-radically polymerized and that contain at least one fluorine atom, fluoroalkyl group, or fluoroalkoxy group attached to the vinyl group that undergoes polymerization. Useful fluoromonomers include, but are not limited to, vinyl fluoride; vinylidene fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether (PEVE), and perfluoro(propyl vinyl) ether (PPVE); perfluoro(1,3-dioxole); perfluoro(2,2-dimethyl-1,3-dioxole) (PDD); $CF_2{=}CFOCF_2CF(CF_3)OCF_2CF_2X$ wherein X is $SO_2F$, $CO_2H$, $CH_2OH$, $CH_2OCN$ or $CH_2OPO_3H$; $CF_2{=}CFOCF_2CF_2SO_2F$; $F(CF_2)_nCH_2OCF{=}CF_2$ wherein n is 1, 2, 3, 4 or 5, $R^1CH_2OCF{=}CF_2$ wherein $R^1$ is hydrogen or $F(CF_2)_m$— and m is 1, 2 or 3, and $R^3OCF{=}CH_2$ wherein $R^3$ is $F(CF_2)_z$— and z is 1, 2, 3 or 4, perfluorobutyl ethylene (PFBE); 3,3,3-trifluoropropene and 2-trifluoromethyl-3,3,3-trifluoro-1-propene. Preferred fluoromonomers are 3,3,3-trifluoropropene, 2-trifluoromethyl-3,3,3-trifluoro-1-propene, PFBE, vinyl fluoride, vinylidene fluoride, TFE, HFP, PMVE, PEVE, PPVE, CTFE, and PDD.

The fluoromonomer may be polymerized alone to form a homopolymer if the fluoromonomer can be homopolymerized, or may be polymerized with one or more other fluoromonomers or other monomers that are not fluoromonomers to form a copolymer. If a copolymer is to be formed, the monomers chosen must be able to copolymerize.

Fluorine-free monomers that copolymerize with some combinations of fluoromonomers include propylene and ethylene. Examples of useful homopolymer fluoropolymers include polytetrafluoroethylene (PTFE). Also usually classed with homopolymer PTFE are the modified PTFE polymers containing fluoromonomers other than TFE in such minor amounts that the modified polymers retain the non-melt-fabricable character of PTFE. Examples of useful copolymers include the copolymers of TFE with HFP and/or perfluorinated vinyl ethers such as PPVE or PEVE, copolymers of TFE with PMVE, copolymers of TFE with PDD, and copolymers of TFE or CTFE with ethylene. Further examples include the copolymers of vinylidene fluoride with HFP, or with HFP and TFE. As implied above, copolymers may contain additional monomers beyond those named. TFE/ethylene copolymers, for example, are most useful if they include additional monomers that introduce bulky side groups such as PFBE, HFP, PPVE or 2-trifluoromethyl-3,3,3-trifluoro-1-propene, and elastomeric polymers frequently include low concentrations of cure site moieties derived from a cure site monomer and/or a chain transfer agent (CTA).

The invention may be understood by referring to FIG. 1 which illustrates equipment suitable for carrying out a preferred process in accordance with the present invention. The equipment illustrated can be used in batch, semi-continuous and continuous processes in which fluoromonomer is polymerized in a pressurized polymerization reactor 10 containing a polymerization medium comprising liquid or supercritical $CO_2$. Reactor 10 may be any of a variety of stirred pressurizable reactors but a vertical, stirred autoclave has been found to be particularly suitable. The reactor should be to be pressurizable to pressure up to about 140 mPa to safely contain the reaction medium containing liquid or supercritical $CO_2$. Stirring is provided by agitator 12 which provides sufficient stirring to keep the contents of the reactor well mixed. Depending on the fluoropolymer being produced and the reaction conditions, the amount of stirring and/or the agitator may need to be modified to insure mixing and prevent the build up of polymer on the reactor walls. For some polymers such as TFE homopolymer, it may be desirable to use a high agitation, fully-wiped mixer.

$CO_2$ is supplied for use in the process from a $CO_2$ supply 14, for example, a cylinder of compressed $CO_2$ with its flow metered by a flowmeter. Monomer, usually in gaseous form, is supplied from a metered source 16. Alternatively, liquid monomers can be supplied by means of positive displacement pump. While only a single monomer supply and flowmeter is depicted, it will be understood that additional monomer supplies may be employed for the production of copolymers where two or more monomers are employed. If a chain transfer agent (CTA) is to be used, it may be supplied similarly to a monomer. A wide range of compounds can be used as chain transfer agent in the process of this invention. Such compounds include, for example, hydrogen-containing compounds such as hydrogen itself, the lower alkanes, and lower alkanes partially substituted with halogen atoms. If used, methanol, ethane or chloroform are preferred.

The $CO_2$ and monomer are fed to first and second stage pumps, 18 and 20 which are used to increase the pressure of the $CO_2$ and monomers and feed them to the reactor. The first stage pump pumps the gases to a pressure of about 0.35 to about 1 MPa. The second stage pump pumps the gases to a pressure of about 7 to about 10 MPa. If desirable, a third stage pump can be used to reach pressures up to about 140 MPa. Preferably, when potentially explosive fluoromonomers such as TFE are used, the monomers are mixed with adequate amounts of $CO_2$ to prevent the mixtures from being explosive under the conditions present during pumping and in the reactor 10.

An initiator supply 22 is used to supply a metered amount of initiator to a initiator pump 24 so that they can be supplied into the reactor 10. Suitable initiators include any of variety of known initiators which initiate free radical polymerization and, since they typically provide the end group for the polymer chain, the initiator also can provide stable end groups to the polymer if desired. Preferably, the initiator is halogenated and most preferably is fluorinated. As will be discussed in more detail hereinafter, it also preferable for the initiator to be collected with the product under the conditions present in the recycle system. For example, a particularly desirable initiator is hexafluoroproplyene oxide (HFPO) dimer peroxide $[(CF_3CF_2CF_2OCF(CF_3)COO)_2]$.

Temperature and pressure conditions in the reactor are selected to maintain the $CO_2$ in the medium in the desired form, i.e., liquid or supercritical, to control the reaction rate, and to adjust product properties and yield. Typically, the temperature is kept between about 10 and about 80° C. Pressures are typically between 6.2 MPa and 10.3 MPa. Residence times are highly dependent upon the specific process being run in the reactor but typically range from about 10 to about 120 minutes.

A process in accordance with the invention further includes withdrawing the polymerization medium from the reactor together with the fluoropolymer and flash decompressing the withdrawn polymerization medium to thereby recover the fluoropolymer from the medium. This is advantageously accomplished using a polymer recovery system 26 of the type illustrated in FIG. 1. Preferably, this system successively withdraws and isolates portions of the polymerization medium including the fluoropolymer from the reactor and the flash decompression is carried out on each of these portions. The preferred recovery system 26 depicted includes upper and lower ball valves, 28 and 30 respectively, in the effluent line 32. Valves 28 and 30 are suitably provided by normally-closed ball valves. Between the valves 28 and 30 is a short tubing section 34, the volume of which defines the portion of the reaction medium be withdrawn and isolated.

The valves 28 and 30 are operated to successively withdraw and isolate the portions of the polymerization medium. In the preferred system depicted, the valves 28 and 30 are suitably operated by a sequencer (not shown) controlling upper and lower solenoids (not shown) which operate the ball valves 28 and 30. The upper ball valve 28 is controlled to open momentarily to withdraw and isolate the reaction medium in the short tubing section 34 at full reactor pressure. The upper ball valve 28 is then closed and the lower ball valve 30 is opened and discharges the isolated portion of reaction medium into the effluent line 32.

Since the isolating and withdrawing of polymerization medium causes an abrupt drop in pressure with each cycle, two sets of ball values, solenoids, and sequencers can be used to decrease the pressure variation. This is accomplished by having the volume of the short tubing section 34 smaller and having the two systems operate out of phase. In larger systems, a rotating star valve can replace the ball valves 28 and 30 and the short tubing section 34.

With the flash decompression of the withdrawn polymerization medium which occurs when valve 30 is opened, the polymerization medium flows through the effluent line 32 very rapidly with the solid polymer being carried along with the rapidly flowing gases. The rapid flow which occurs upon flash decompression thus reduces fouling of the effluent line caused by polymer adhering to the effluent line wall which may occur under low flow conditions. The flash decompression also causes rapid cooling which substantially causes the polymerization reaction to stop. In the preferred process using an initiator such as HFPO dimer peroxide, it has been discovered that the unspent initiator becomes associated with the polymer and thus is removed from the gases. Thus, because of the flash decompression, product properties are not changed substantially after the polymer leaves the reactor and before removal from the polymer recovery system 26, i.e., the conditions inside the reactor determine the properties of the polymer produced. Preferably, care is taken to avoid temperatures in the effluent line 32 and during polymer collection which could cause continued polymerization.

The rapidly flowing gases and entrained polymer pass though a three-way valve 36 which is open to one of two collection vessels 38. The three-way valve 36 facilitates the changing of collection vessels since the gas and entrained polymer particles is directed into only one vessel a time. Inside each collection vessel 38 is a filter bag 40 of a suitable woven or nonwoven fabric which catches the polymer but which permits the gases to pass through. Gases exit each of the collection bottles through line 42 for recycling by a recycling system 44.

Recycling system 44 includes the capability to reuse the reusable components of the gas stream, i.e., $CO_2$ and unreacted monomers. The recycling system 44 includes a monomer/$CO_2$ ballast tank 46 which reduces the pressure variation and homogenizes the composition of the recycle stream and a return line 48 which provides the recycle gas stream to the line feeding the first stage pump 18. The ballast tank 46 includes a low volume vent 50 which performs two major functions. The vent is needed to remove excess $CO_2$ to enable the use of a feed mixture of TFE and $CO_2$ which, in the event the recycle gases are cut off or reduced, can be safely compressed to reactor pressures. In addition, the vent 50 prevents build-up of impurities and by-products in the recycle gas stream. If desired, the impurites and by-products can be removed from this vent stream and $CO_2$ and monomers can be recycled for use in the process.

The control of the process is preferably performed by a microprocessor (not shown). The inputs to the microprocessor preferably include measurements from a gas chromatograph which monitors the composition of the gases in the recycle composition and the monomer supply streams. Flow rates of the vent 50 and monomer supply are also input. Pressure and temperature of the reactor are also measured. Based on the inputs, the microprocessor controls the sequencer operating the ball valves 28 and 30, supply flows and vent flow.

While the process of the invention can be used for batch and semi-continuous operation, the invention is advantageously used in processes in which the polymerizing is carried out continuously by continuously feeding $CO_2$ and fluoromonomer into the reactor and continuously withdrawing the contents of the reactor, including unreacted fluoromonomer, the $CO_2$, and the fluoropolymer. It is further preferred to feed $CO_2$ and fluoromonomer and to withdraw the contents of the reactor in such a manner that a substantially steady state composition of the medium in the reactor is established. Uniformity of the polymer can be improved by operation in this manner.

The invention can also provide processes with high space time yields, especially continuous processes with high space time yields.

For some polymers, it is desirable to treat the polymers after recovery to eliminate components which give off gases upon heating. Typically, such treatment is suitably accomplished by heating in a vacuum over at a temperature range of about 75 to about 150° C. for 60 minutes. Alternatively, an extractor/extruder can perform the same function at the same time the polymer is processed into intermediate or final product.

EXAMPLES

Example 1

This example illustrates the polymerization of TFE/PEVE dipolymer in a continuous reaction.

A 1 liter vertical stirred autoclave with feed, control and recycling systems as described in FIG. 1 is flushed with pure $CO_2$ and the pressure is increased and the temperature set as in Table 1. For 1 hour prior to starting monomer feeds, HFPO dimer peroxide intiator and $CO_2$ are fed into the reactor. Monomer feeds are begun under the conditions and at the feed rates indicated in Table 1. The dipolymer is polymerized continuously and polymer is produced at the rates provided in Table 2. Polymer samples are taken periodically during polymer production and the measured product properties are as described in Table 2. The average space time yield of this continuous process is 0.26 lb/gal·hr (31.8 g/L·hr).

TABLE 1

| | |
|---|---|
| Reactor Temperature | 25° C. |
| Reactor Pressure | 1050 psig (7.34 MPa) |
| Agitator Speed | 600 rpm |
| $CO_2$ Feed Rate | 518 g/hr |
| TFE Feed Rate | 145 g/hr |
| PEVE Feed Rate | 52 g/hr |
| Ethane Feed Rate | 1.7 g/hr |
| Initiator Feed Rate | 0.38 g/hr |

TABLE 2

| | Sample 1 8–10 hr | Sample 2 12–14 hr | Sample 3 16–20 hr |
|---|---|---|---|
| DSC 1st Heat(°0 C.) | 304 | 303 | 303 |
| Viscosity ($10^4$ Poise) | 3.39 | 3.39 | 2.82 |
| NMR Analysis (wt %) | | | |
| TFB | 96.40 | 96.33 | 96.19 |
| PBVB | 3.58 | 3.66 | 3.80 |
| Polymer Produced (g) | 60.6 | 65.0 | 124.7 |

Example 2

This example illustrates the polymerization of TFE/HFP/PEVE terpolymer in a continuous reaction.

The procedure of Example 1 is used except that HFP is also used and that the conditions and monomer feeds are as indicated in Table 3. Product samples are taken periodically and the results reported in Table 4. The average space time yield of this continuous process is 0.3 lb/gal·hr (35.5 g/L·hr).

TABLE 3

| | |
|---|---|
| Reactor Temperature | 25° C. |
| Reactor Pressure | 1050 psig (7.34 MPa) |
| Agitator Speed | 600 rpm |

TABLE 3-continued

| | |
|---|---|
| $CO_2$ Feed Rate | 260 g/hr |
| TFB Feed Rate | 55 g/hr |
| HFP Feed Rate | 200 g/hr |
| PEVE Feed Rate | 4.0 g/hr |
| Initiator Feed Rate | 0.018 g/hr |

TABLE 4

| | Sample 1 4–6 hr | Sample 2 8–10 hr | Sample 3 12–14 hr |
|---|---|---|---|
| DSC 1st Heat (° C.) | 291 | 289 | 287 |
| Viscosity ($10^3$ Poise) | 3.78 | 5.19 | — |
| Polymer Produced (g) | 69.6 | 71.8 | 71.5 |

Example 3

This example illustrates the polymerization of PTFE micropowder in a continuous reaction.

The procedure of Example 1 is used except that only TFE monomer is used and that the conditions and monomer feeds are as indicated in Table 5. Product samples are taken periodically and the results reported in Table 6. The average space time yield for this continuous process is 0.79 lb/gal·hr (94.4 g/L·hr).

TABLE 5

| | |
|---|---|
| Reactor Temperature | 25° C. |
| Reactor Pressure | 1050 psig (7.34 MPa) |
| Agitator Speed | 600 rpm |
| $CO_2$ Feed Rate | 518 g/hr |
| TFE Feed Rate | 145 g/hr |
| Ethane Feed Rate | 1.7 g/hr |
| Initiator Feed Rate | 0.0064 g/hr |

TABLE 6

| | Sample 1 6–8 hr | Sample 2 10–12 hr | Sample 3 14–16 hr |
|---|---|---|---|
| DSC 1st Heat (° C.) | 329 | 328.0 | 329 |
| Viscosity ($10^4$ Poise) | 4.3 | 3.27 | 3.15 |
| Polymer Produced (g) | 187.7 | 188.1 | 190.3 |

Example 4

This example illustrates the polymerization of TFE/PEVE dipolymer in a continuous reaction in $CO_2$ under supercritical conditions.

Reactor hardware configuration used is the same as used for polymerization of TFE/PEVE in Example 1 in liquid $CO_2$ with one exception. A high pressure liquid pump is installed inline between the high pressure discharge side of the second stage pump 20 and the reactor inlet thus providing sufficient pressure to supply $CO_2$ and monomers into the reactor at supercritical pressures.

The conditions and monomer feeds employed in this Example are as indicated in Table 7. Product samples are taken periodically and the results reported in Table 8. The average space time yield of this continuous process is 1.23 lb/gal·hr (148 g/L·hr).

TABLE 7

| | |
|---|---|
| Reactor Temperature | 40° C. |
| Reactor Pressure | 2000 psig (13.9 MPa) |
| Agitator Speed | 800 rpm |
| $CO_2$ Feed Rate | 300 g/hr |
| TFE Feed Rate | 230 g/hr |
| PEVE Feed Rate | 70 g/hr |
| Ethane Feed Rate | 0.4 g/hr |
| Initiator Feed Rate | 0.18 g/hr |

TABLE 8

| | Sample 6 17–19 hr | Sample 7 20–22 hr | Sample 8 23–25 hr |
|---|---|---|---|
| DCS | | | |
| $1^{st}$ melt (° C.) | 288 | 288 | 289 |
| $2^{nd}$ melt (° C.) | 280 | 279 | 281 |
| Viscosity ($10^4$ Poise) | 2.78 | 2.77 | 2.90 |
| FTIR Analysis (wt %) | | | |
| TFE | 94.10 | 94.04 | 94.24 |
| PEVE | 5.90 | 5.96 | 5.76 |
| Polymer Produced (g) | 449 | 454 | 469 |

What is claimed is:

1. Process comprising polymerizing fluoromonomer to obtain a fluoropolymer, said polymerization being carried out in a pressurized polymerization reactor containing a polymerization medium comprising liquid or supercritical $CO_2$, withdrawing said polymerization medium from said reactor together with said fluoropolymer and flash decompressing said withdrawn polymerization medium to thereby recover said fluoropolymer from said medium.

2. Process of claim 1 further comprising stirring said polymerization medium to distribute said fluoromonomer and said fluoropolymer in said medium and withdrawing said polymerization medium from said reactor so that said medium withdrawn has substantially the same composition as medium remaining in said reactor.

3. Process of claim 1 wherein portions of said polymerization medium including said fluoropolymer are successively withdrawn and isolated from said reactor and said flash decompression is carried out on each said portion.

4. Process of claim 1 wherein said polymerizing is carried out continuously by continuously feeding $CO_2$ and fluoromonomer into said reactor and continuously withdrawing the contents of said reactor, including unreacted fluoromonomer, said $CO_2$, and said fluoropolymer.

5. Process of claim 4 wherein said feeding of $CO_2$ and fluoromonomer and said withdrawing of the contents of said reactor are carried out to establish a substantially steady state composition of said medium in said reactor.

6. Process of claim 5 wherein said medium withdrawn has substantially the same composition as said steady state composition in said reactor.

7. Process of claim 1 wherein said polymerization medium further comprises an initiator which becomes associated with the polymer recovered from the process.

* * * * *